United States Patent [19]

Osborn et al.

[11] Patent Number: 5,277,078
[45] Date of Patent: Jan. 11, 1994

[54] VEHICLE SHIFTER WITH ROLLER AND DETENT TYPE SHIFT LEVER POSITIONER

[75] Inventors: Charles Osborn, Spring Lake; Richard L. Meisch, Muskegon, both of Mich.

[73] Assignee: Grand Haven Stamped Products, Div. of JSJ Corporation, Grand Haven, Mich.

[21] Appl. No.: 966,873

[22] Filed: Oct. 26, 1992

[51] Int. Cl.⁵ .......................... G05G 5/03; G05G 5/06
[52] U.S. Cl. ........................................ 74/475; 74/527;
267/158; 403/329; 403/353; 384/419
[58] Field of Search ............... 74/475, 527; 267/158;
384/58, 418, 419; 403/329, 353; 492/14, 47

[56] References Cited

U.S. PATENT DOCUMENTS

| | | | |
|---|---|---|---|
| 1,550,614 | 8/1925 | Hunt | 384/419 |
| 2,725,830 | 12/1955 | Shebesta | 492/14 |
| 3,722,927 | 3/1973 | Miska | 403/329 X |
| 3,759,178 | 9/1973 | Franchinot et al. | 101/349 |
| 4,174,644 | 11/1979 | Nagy et al. | 74/475 X |
| 4,610,179 | 9/1986 | Parker | 74/475 X |
| 4,645,046 | 2/1987 | Takano et al. | 74/475 X |
| 4,909,275 | 3/1990 | Massey et al. | 267/158 X |
| 5,062,509 | 11/1991 | Carpenter et al. | 74/483 X |

*Primary Examiner*—Allan D. Herrmann
*Attorney, Agent, or Firm*—Price, Heneveld, Cooper, DeWitt & Litton

[57] ABSTRACT

A vehicle transmission shifter mechanism having a shift lever frame including a roller detent, a shift lever shiftable to a plurality of different shift positions and a feel positioner for providing a feel to a vehicle operator for establishing each of the shift positions is provided with an improvement, the improvement being a leaf spring configured in a U-shaped arrangement at one end to quick connect into a pair of spaced apertures in a plate on the shift lever, and configured at the other end with opposing fingers to snappingly quick connect to a roller for rollingly engaging the roller detent. The roller is biased against the roller detent which generates reactive forces on the one end of the leaf spring causing the one end to be securely retained in the spaced apertures in the plate and causing the roller to be securely retained in the opposing fingers on the other end.

19 Claims, 3 Drawing Sheets

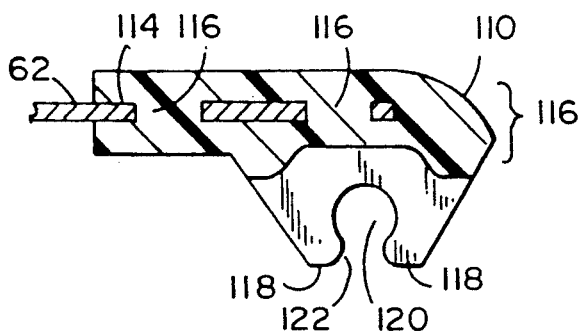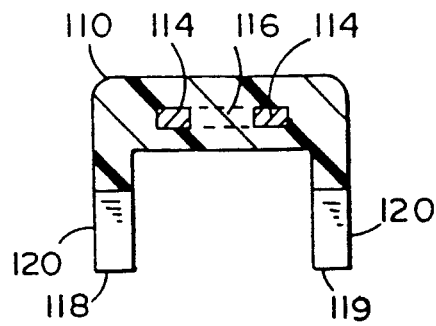
FIG. 6  FIG. 7
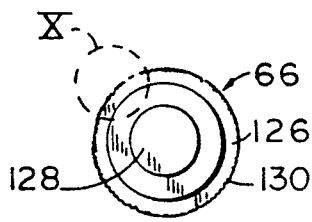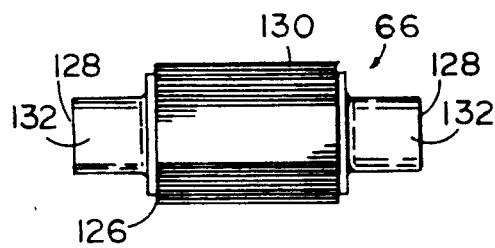
FIG. 8  FIG. 9
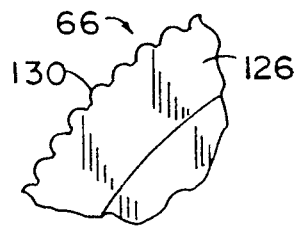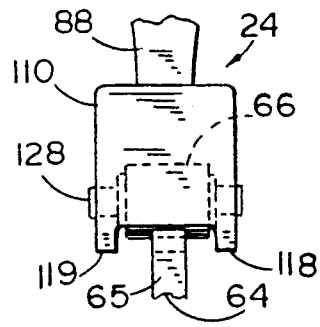
FIG. 10  FIG. 12
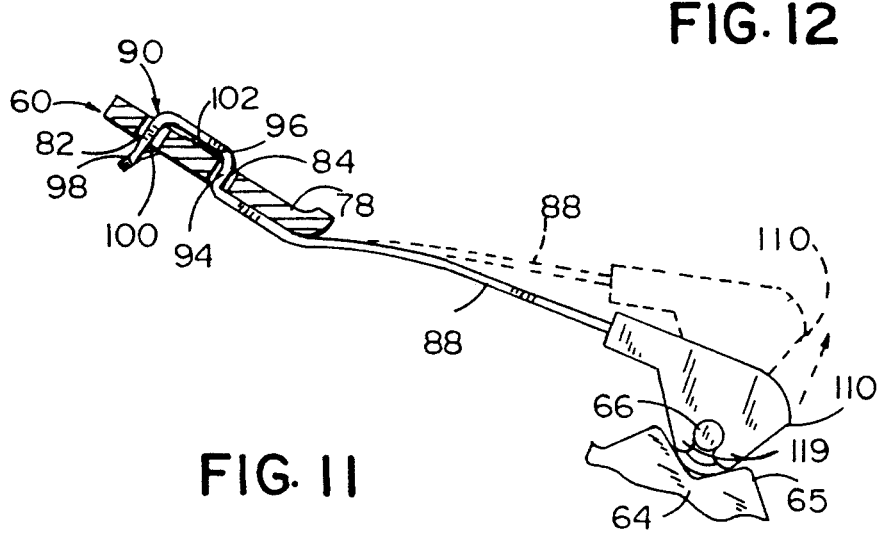
FIG. 11

VEHICLE SHIFTER WITH ROLLER AND DETENT TYPE SHIFT LEVER POSITIONER

BACKGROUND OF THE INVENTION

The present invention relates to vehicle transmission shift mechanisms, and in particular to an improved shift lever positioner providing assembly advantages.

Vehicle transmission shifter mechanisms commonly have a feel positioner that gives the vehicle operator an improved "feel" for each gear shift position. The feel positioner allows the feel to be customized for given vehicle models. For example, the feel can be made rough and somewhat stiff for a high performance vehicle model, or it can be made smoother and more luxurious for a more expensive model, even though a similar transmission and/or power train is used. However, this customization has lead to a proliferation of parts, with non-standardized parts being developed for particular vehicle model and power train combinations. Further, subassembly of the feel positioner to the shifter mechanism commonly involves subassembling the multiple non-standardized parts by secondary mechanical fastening methods such as riveting, staking, welding and the like, thus further increasing assembly time, in-process inventories and manufacturing costs. These increased costs are undesirable, particularly in view of the competitive vehicle manufacturing environment now being experienced.

Thus, an improved device solving the aforementioned problems is desired.

SUMMARY OF THE INVENTION

One aspect of the present invention is to provide an improved feel positioner for a vehicle transmission shifter mechanism having a shift lever shiftable to a plurality of different shift positions. The shifter mechanism includes a feel positioner means for providing a feel to a vehicle operator for establishing each of the shift positions. The feel positioner means is comprised of a roller movable with the shift lever, and a leaf spring member which biases the roller into engagement with a roller detent on the shifter mechanism. The leaf spring member includes a configurated end portion at one end, with the roller being operably mounted at the other end. The spring member is operatively connected to the shift lever by a quick connection means, the quick connection means including a plate mounted on the shift lever having opening means therein for receiving the configurated end, with the relationship of the configurated end and the opening means when the configurated end is received within the opening means and the roller is biased into engagement with the roller detent being such as to prevent removal of the configurated end from the opening means.

In another aspect of the present invention, a feel positioner includes a leaf spring member having at one end connecting means for operatively connecting the leaf spring member to the shift lever and at the other end a quick connection means for a roller. A roller is constructed of plastic and includes a shaft means extending beyond both ends of the roller. The roller quick connection means includes a plastic roller support mounted on the other end of the leaf spring member, the roller support defining a recess for receiving and rotatably retaining the shaft means.

These and other features, advantages and objects of the present invention will be further understood and appreciated by those skilled in the art by reference to the following specification, claims and appended drawings.

BRIEF DESCRIPTION OF THE DRAWINGS

FIG. 6 is a cross-sectional view of the leaf spring member only but taken along the plane VI—VI in FIG. 5;

FIG. 7 is a cross-sectional view of the leaf spring member only but taken along the plane VII—VII in FIG. 5;

FIG. 8 is a side view of the roller shown in FIG. 4;

FIG. 9 is a front elevational view of the roller shown in FIG. 8;

FIG. 10 is an enlarged partial side view of the circled portion labeled X in FIG. 8;

FIG. 11 is a fragmentary side view of the feel positioner, the feel positioner being shown in solid lines as engaging a depression in the roller detent and being shown in dashed lines as flexed away from the roller detent depression to allow the roller to move over one of the bumps in the roller detent to successive of the depressions; and FIG. 12 is a fragmentary end view of the feel positioner shown in FIG. 3.

DETAILED DESCRIPTION OF THE PREFERRED EMBODIMENTS

Figure 1:
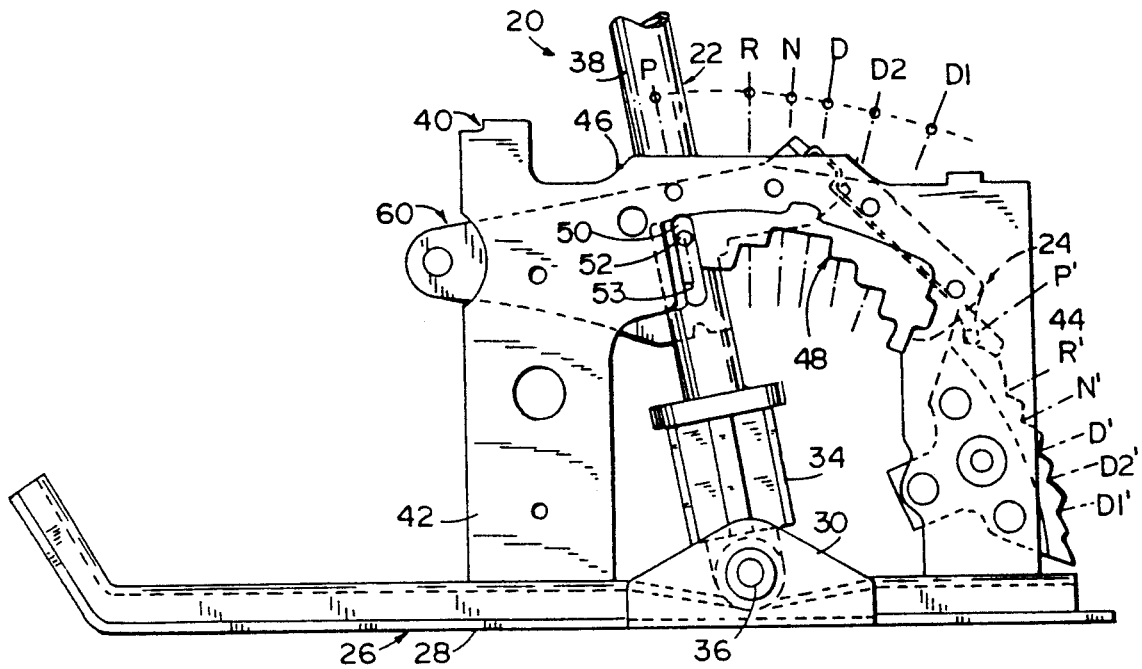
FIG. 1 is a side elevational view of a vehicle transmission shifter mechanism embodying the present invention.

For the purposes of description herein, the terms "upper," "lower," "right," "left," "rear," "front," "vertical," "horizontal" and derivatives thereof shall relate to the invention as oriented in FIG. 1 with the front being generally at the left of the drawing. However, it is to be understood that the invention may assume various alternative orientations except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not be be considered as limiting, unless the claims expressly state otherwise.

Figure 2:
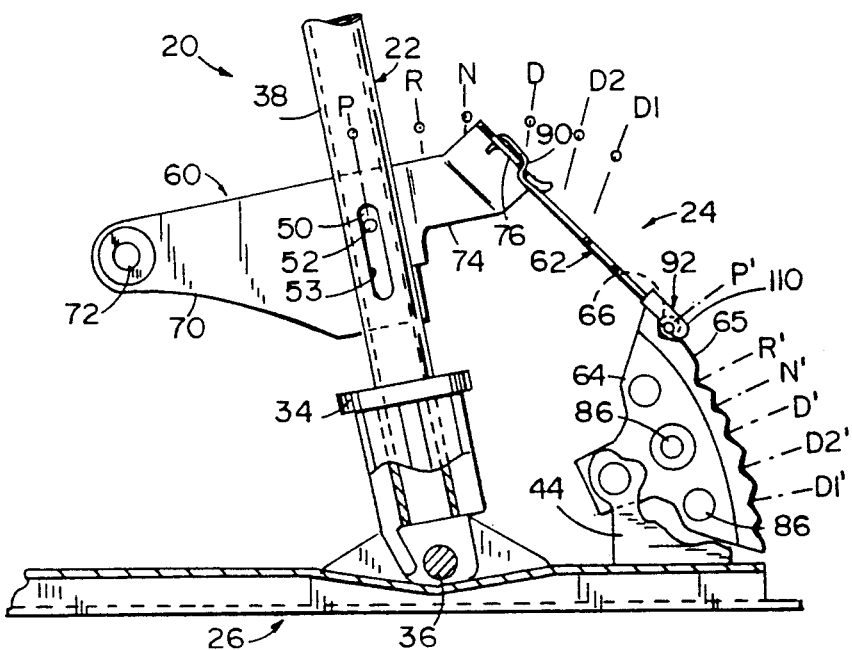
FIG. 2 is a side cross-sectional view of the vehicle transmission shifter mechanism shown in FIG. 1 but with a portion of same removed to more clearly expose the shift lever and feel positioner.

The reference numeral 20 (FIGS. 1 and 2) generally designates a vehicle transmission shifter mechanism having a shift lever 22 shiftable to a plurality of different shift positions, and a feel positioner 24 for providing a feel to a vehicle operator for establishing each of the shift positions. The feel positioner is particularly adapted for use in conjunction with a plurality of different shifter mechanisms to reduce the number of specialized parts and subassembly operations required to attach feel positioner 24 to a particular shifter mechanism.

Shifter mechanism 20 includes a stationary shifter frame 26 including a bottom 28 adapted to be secured to a vehicle floor (not shown), and side flanges 30 extending upwardly from each side of bottom 28. Shift lever 22 is pivotally attached to frame 26, shift lever 22 including a plastic base 34 pivotally attached between and to flanges 30 by rivet-like bushings 36, and a post 38 extending upwardly from base 34.

An inverted U-shaped generally planar detent plate 40 includes longitudinally spaced apart legs 42 and 44 connected to the longitudinal centerline of bottom 28, and a cross piece 46 connected to the top of legs 42 and 44 and positioned adjacent shift lever post 38. Detent plate cross piece 46 has a notched lower surface 48 defining various gear shift positions, such as "park" (P), "reverse" (R), "neutral" (N), "drive" (D), "drive second gear" (D2) and "drive first gear" (D1). A pawl member 50 is slideably mounted in shift lever post 38 and movable in a longitudinal direction defined by post 38. Pawl member 50 includes an arm or pawl 52 that extends laterally through a slot 53 in post 38 and engages notched lower surface 48, thus operably securing shift lever 32 in a selected one of the various gear shift positions.

The present invention is focused on the feel positioner 24 (FIG. 2) which includes a particularly configured connector plate 60 attached to shift lever post 38, a leaf spring member 62 adapted for quick connection to plate 60, and a roller detent 64 attached to rear leg 44, roller detent 64 having an upper undulated surface 65 that is operably engaged by a roller 66 mounted to the free end of the leaf spring member 62.

Figure 3:
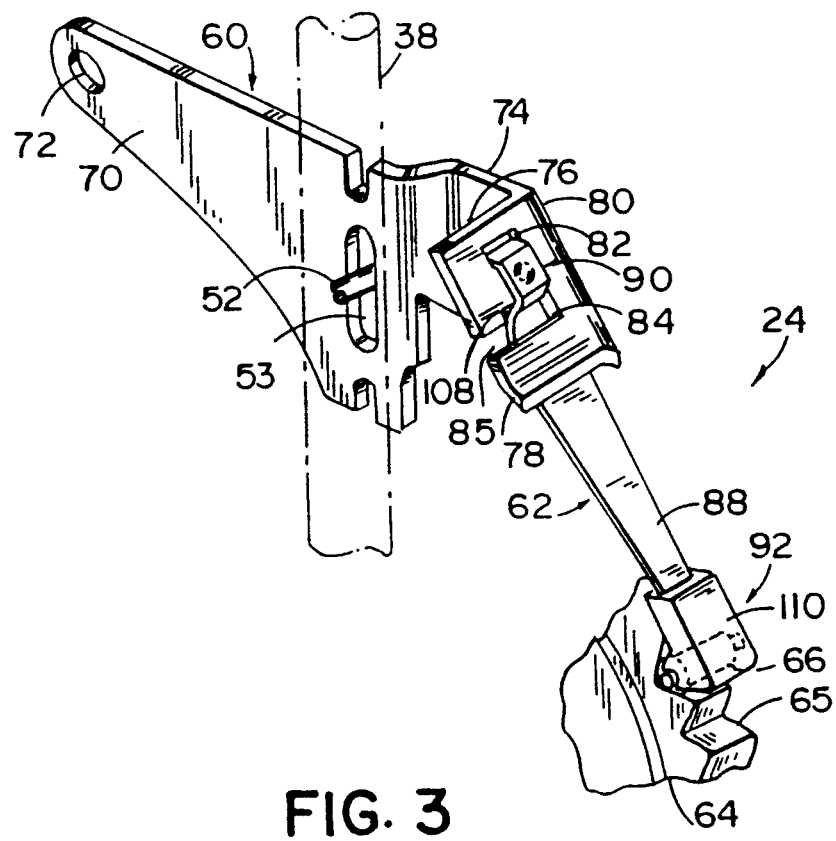
FIG. 3 is a fragmentary perspective view of the feel positioner including the leaf spring member, the roller and the shift lever plate.

Connector plate 60 (FIG. 3) is an elongate generally planar bracket welded or otherwise secured to post 38, connector plate 60 being oriented generally fore-to-aft on shift lever post 38. Connector plate 60 includes a front leg or cable attachment arm 70 that extends laterally forwardly and includes a connector opening 72 such as for connecting to a transmission shift cable (not shown). Connector plate 60 further includes a rear leg or feel positioner supporting leg 74 that extends laterally rearwardly and includes a perpendicularly oriented flange 76 that generally tangentially aligns with upper surface 65 of roller detent 64. Flange 76 includes an unsupported or free side edge 78 and a supported side edge 80. An opening means is formed in flange 76 for releasably receiving an end of leaf spring member 62, the opening means including a rectangular aperture or opening 82 and a slot or opening 84 spaced from aperture 82. In particular, slot 84 is positioned on the side of aperture 80 which is closer to roller detent 64. Slot 84 is generally rectangular, but includes a narrow inlet or entrance opening 85 that extends fully to the unsupported side edge 78, the purpose of which is described below.

Roller detent 64 (FIG. 2) is a plate-like body securely attached to rear leg 44 on the same side as shift lever plate 60, and includes an upper surface 65 having multiple depressions P', R', N', D', D2' and D1' that are spaced to correspond to the gear shift positions, P, R, N, D, D1 and D2, respectively, which are defined in the notched lower surface 48 of detent plate 40. Roller detent 64 is secured to rear leg 44 by fasteners 86 with upper surface 65 being spaced away from leg 44 to facilitate uninhibited engagement of upper surface 65 by roller 66. Upper surface 65 is made from plastic to provide quiet operation and smooth engagement.

Figure 4:
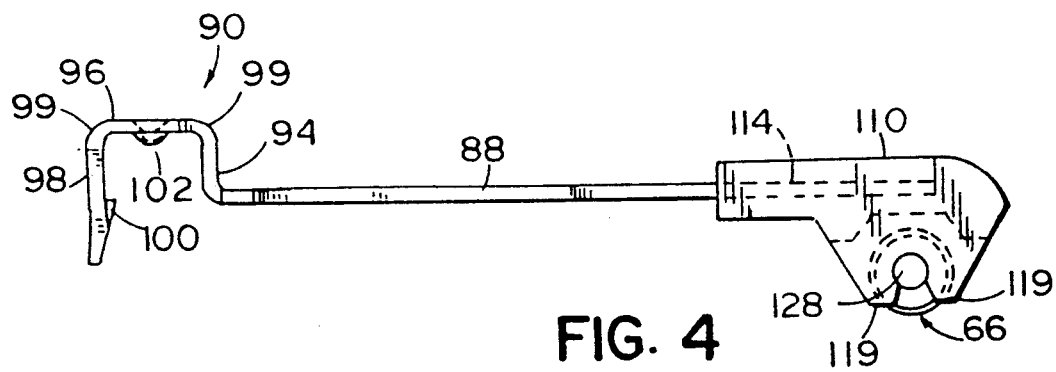
FIG. 4 is a side view of the leaf spring member and roller shown in FIG. 3.
Figure 5:
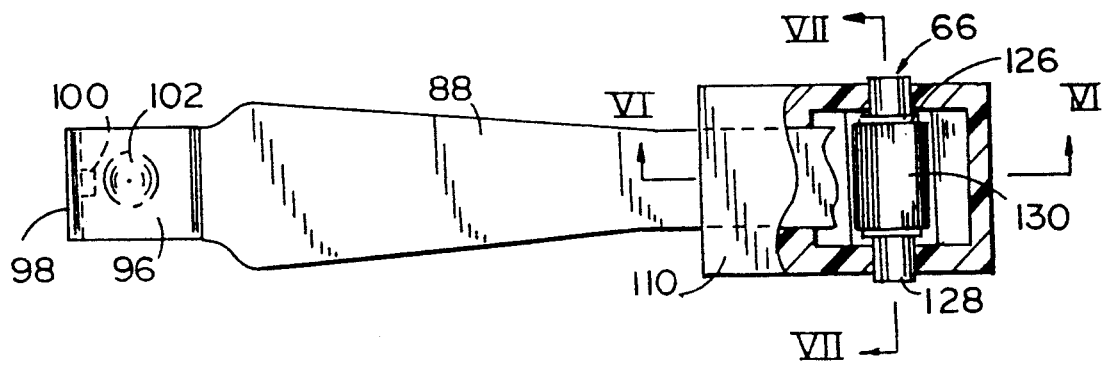
FIG. 5 is a partially broken away plan view of the leaf spring member shown in FIG. 4.

Leaf spring member 62 (FIG. 3) includes a leaf spring body 88 made of S.A.E. 1075 steel or other suitably resilient material, and further includes a configurated end 90 and a roller supporting end 92. Configurated end 90 (FIG. 4) is U-shaped with a first leg or segment 94 extending generally perpendicularly to leaf spring body 88, a second leg or segment 96 extending generally perpendicularly to first leg 94, and a third leg or segment 98 extending generally perpendicularly to second leg 96. Legs 94, 96 and 98 are connected by corners 99, corners 99 being reasonably sharply made but not so sharp as to cause stress fractures or other breakage in leaf spring member 62. Third leg 98 extends a distance greater than first leg 94, and includes an offset locking portion or barb 100 that engages the material defining aperture 82 so that when third leg 98 is fully inserted into aperture 82, barb 100 retains same therein.

Configurated end 90 can be secured into the opening means on plate 60 by inserting first leg 94 laterally through inlet 85 into slot 84. Leaf spring member 62 is then tipped so that third leg 98 slides into aperture 82 with spring body 88 thus being located below plate flange 76 and spring second leg 96 being located above spring plate flange 76. Where necessary, the free end of third leg 98 can be bent backwardly toward first leg 98 to facilitate placing third leg 98 into aperture 82. Optimally, second leg 96 includes a depression or bight 102 to stabilize the connection of configurated end 90 to flange 76 and to space the corners 99 a distance above the marginal flange material forming apertures 82 and slot 84 so as to avoid wear or stress risers that might occur from contact. A tooth-like corner 108 formed at the joinder of inlet 85 and slot 84 abuts the edge of first leg 94 to help retain first leg 94 in slot 84.

Roller supporting end 92 (FIG. 4) is formed by a plastic housing or roller support 110 that is insert molded onto leaf spring end 114, leaf spring end 114 including apertures 116 (FIGS. 6 and 7) so that plastic housing 110 is securely positioned on end 114 once molded thereon. Plastic housing 110 includes a leaf spring engaging upper portion 116 and two spaced apart pairs of downwardly extending opposing fingers 118 and 119. Finger pairs 118 and 119 each define an aligned cylindrically-shaped aperture or recess 120, and further define narrowed inlet or neck 122 to the apertures 120, inlets 122 permitting access to apertures 120 from a direction perpendicular to the centerline of apertures 120. Specifically, inlets or necks 122 define a dimension less than the dimension of apertures 120, and less than the dimension of shafts 128 on rollers 66 as noted below. Optimally, roller supporting end 92 is formed of a low coefficient material so that roller 66 can be rotatably snappably and securely mounted therein with minimal resistance to rotation once installed.

Roller 66 (FIGS. 8–10) is a plastic part made of nylon or the like, including a cylindrically-shaped center portion 126 and axially aligned shafts 128 integrally molded with portion 126 and extending from either end thereof. The surface 130 of center portion 126 is serrated to improve the frictional resistance between roller 66 and undulated upper surface 65 causing the roller 66 to rotate as roller 66 is moved over roller detent upper surface 65. Contrastingly, shafts 128 have a smooth outer surface 132 to minimize resistance to rotation with plastic housing 110. Shafts 128 have a diameter that is greater than inlet 122 but slightly less than aperture 120 so that rollers 66 can be snapped into plastic housing 110 between finger pairs 118 and 119 in a manner to facilitate quick connection. Further, center portion 126 has a length adapted to fit in the space between finger pairs 118 and 119, thus preventing shafts 128 from moving axially out of apertures 120.

OPERATION

Having described the components and interrelationships thereof, the uses and advantages of the present invention will become apparent to one of ordinary skill in the art. As described above, feel positioner 24 can be quickly assembled to shifter mechanism 20. In particular, leaf spring member 62 can be quickly connected to connector plate 60 by inserting first leg 94 into slot 84 in connector plate flange 76, tipping leaf spring member 60 so as to slip third leg 98 into aperture 82 and then assuring that third leg 98 is fully seated within aperture 82 so that barb 100 engages the underside of flange 76 to securely retain same therein with bight 102 of second leg 96 abutting the upper portion of flange 76. Further, roller 66 is attached to the opposite end of leaf spring member 62 by snapping roller shafts 128 into apertures 120, with roller center portion 126 resting in the space between the finger pairs 118 and 119. As thus installed, roller 66 engages the upper surface 65 of roller detent 64 biasing leaf spring member 62 upwardly, which biasing force securely retains leaf spring member 62 within the opening means in connector plate 60. As shift lever 38 is moved between gear shift positions, roller 66 rollingly moves over undulated upper surface 65, causing spring body 88 to flex.

In the foregoing description, it will be readily appreciated by those skilled in the art that modifications made be made to the invention without departing from the concepts disclosed herein. Such modifications are to be considered as included in the following claims unless these claims by their language expressly state otherwise.

The embodiments of the invention in which an exclusive property or privilege is claimed are defined as follows.

1. In a vehicle transmission shifter mechanism having a shift lever shiftable to a plurality of different shift positions, said shifter mechanism including a feel positioner means for providing a feel to the vehicle operator for establishing each of said shift positions, said feel positioner means comprising a roller detent having notches, each notch representing a position of said shift lever, a roller movable with said lever and mounted on one end of a leaf spring member, and a support plate having a portion extending generally in the same direction as said leaf spring, said leaf spring member secured at its other end to said portion of said plate whereby said roller is biased by said leaf spring member in a direction toward said roller detent causing it to engage a notch of said roller detent depending upon the position of said shift lever, the improvement comprising:

said other end of said leaf spring member having a configurated end portion connected to said support plate portion by a quick connection means, said quick connection means comprising said plate portion having opening means for receiving said configurated end portion, the relationship of said configurated end position and said opening means when said configurated end portion is received within said opening means causing said roller to be biased into engagement with said roller detent while at the same time preventing accidental removal of said configurated end from said opening means.

2. The shifter mechanism of claim 1 in which said other end of said leaf spring member includes a plastic roller support for receiving the roller, the plastic having a low coefficient of friction whereby a bearing having a low coefficient of friction is provided permitting rotation of the roller.

3. The shifter mechanism of claim 1 in which the relationship of said configurated end and opening means permits said configurated end to be inserted into said opening means when said roller is removed from engagement with said roller detent.

4. The shifter mechanism of claim 1 in which said plate includes a cable attachment arm adapted to securely receive an end of a transmission shift cable.

5. The shifter mechanism of claim 4 in which said cable attachment arm includes a flange which includes means for receiving the cable end including an opening.

6. In a vehicle transmission shifter mechanism having a shift lever shiftable to a plurality of different shift positions, said shifter mechanism including a feel positioner means for providing a feel to the vehicle operator for establishing each of said shift positions, said feel positioner means comprising a roller movable with said lever and biased by a leaf spring member causing it to engage a roller detent, the improvement comprising:

said leaf spring member having a configurated end portion at one end and a roller mounted at its other end, said spring member operatively connected to said shift lever by a quick connection means, said quick connection means comprising a plate mounted on said shift lever and having opening means for receiving said configurated end, the relationship of said configurated end and opening means when said configurated end is received within said opening means and said roller is biased into engagement with said roller detent being such as to prevent removal of said configurated end from said opening means;

said opening means in said plate including two spaced openings and said configurated end being generally U-shaped having two legs spaced longitudinally of said leaf spring, one of said legs extending through one of said openings and the other of said legs extending through the other of said openings.

7. The shifter mechanism of claim 6 in which the openings are spaced from each other in the longitudinal direction said leaf spring member extends, one of said openings nearest said roller extending laterally of said longitudinal direction to the edge of said leaf spring member whereby the one leg nearest the roller can be inserted in a lateral direction into said one nearest opening and said leaf spring member can be tipped to extend the other leg into the other opening.

8. The shifter mechanism of claim 7 in which said other leg includes an offset locking portion which engages the edge of said other opening to assist in holding the configurated end of said leaf spring member on said plate.

9. The shifter mechanism of claim 6 in which the U-shaped configurated end includes a bight portion that is depressed so as to engage that portion of said plate between said openings to stabilize said connection of said leaf spring member to said plate.

10. In a vehicle transmission shifter mechanism having a shift lever shiftable to a plurality of different shift positions, said shifter mechanism including a feel positioner means for providing a feel to the vehicle operator for establishing each of said shift positions, said feel positioner means comprising a roller movable with said lever and biased by a leaf spring member causing it to engage a roller detent, the improvement comprising:

said leaf spring member having at one end means for operatively connecting said leaf spring member to said shift lever and at its other end a roller quick connection means for said roller;

said roller constructed of plastic and including shaft means extending beyond both ends of said roller;

said roller quick connection means comprising a plastic roller support insert molded on said other end and having a recess for receiving and rotatably retaining said shaft means; and said roller support including an entrance opening extending from said recess to the outside of said support, said opening having a neck of less dimension than the dimension of said recess and lesser dimension than the dimension of said shaft, the material of said support defining said neck being sufficiently resilient to permit said shaft to be forced into and retained in said recess.

11. The vehicle transmission shifter mechanism of claim 10 wherein said roller and shaft means are molded of plastic as a unit.

12. In a vehicle transmission shifter mechanism having a shift lever shiftable to a plurality of different shift positions, said shifter mechanism including a feel positioner means for providing a feel to the vehicle operator for establishing each of said shift positions, said feel positioner means comprising a roller detent having notches, each notch representing a position of said shift lever, a roller movable with said lever and mounted on one end of a leaf spring member, and a support plate having a portion extending generally in the same direction as said leaf spring, said leaf spring member secured at its other end to said portion of said plate whereby said roller is biased by said leaf spring member in a direction toward said roller detent causing it to engage a notch of said roller detent depending upon the position of said shift lever, the improvement comprising:

said leaf spring member having a configured end portion connected to said support plate portion by a first quick connection means, said first quick connection means comprising said plate portion having opening means receiving said configured end portion, the relationship of said configured end portion and opening means when said configured end portion is received within said opening means causing said roller to be biased into engagement with said roller detent while at the same time preventing accidental removal of said configured end from said opening means;

said leaf spring member having at its other end a second quick connection means for said roller, said roller including shafts extending beyond both ends of said roller, said second quick connection means comprising a roller support mounted on said other end and having a bearing recess for receiving and rotatably retaining said shafts and roller.

13. The shifter mechanism of claim 12 including an entrance opening extending from said recess to the outside of said roller support, said entrance opening having a neck of lesser dimension than the dimension of said recess and of lesser dimension than the dimension of said shaft, the material of said support defining said neck being sufficiently resilient to permit said shaft to be forced into and retained in said recess.

14. In a vehicle transmission shifter mechanism having a shift lever shiftable to a plurality of different shift positions, said shifter mechanism including a feel positioner means for providing a feel to the vehicle operator for establishing each of said shift positions, said feel positioner means comprising a roller movable with said lever and biased by a leaf spring member causing it to engage a roller detent, the improvement comprising:

said leaf spring member having a configured end portion at one end and a roller mounted at its other end, said spring member operatively connected to said shift lever by a first quick connection means, said first quick connections means comprising a plate mounted on said shift lever and having opening means receiving said configured end, the relationship of said configured end and opening means when said configured end is received within said opening means and said roller is biased into engagement with said roller detent being such as to prevent removal of said configured end from said opening means;

said leaf spring member having at its other end a second quick connection means for said roller, said roller including shafts extending beyond both ends of said roller, said second quick connection means comprising a roller support mounted on said other end and having a bearing recess for receiving and rotatably retaining said shafts and roller;

an entrance opening extending from said recess to the outside of said roller support, said entrance opening having a neck of lesser dimension than the dimension of said recess and of less dimension than the dimension of said shaft, the material of said support defining said neck being sufficiently resilient to permit said shaft to be forced into and retained in said recess; and said plate including two spaced openings and said configured end being generally U-shaped having two legs spaced longitudinally of said leaf spring member, one of said legs extending through one of said openings and the other of said legs extending through the other of said openings.

15. The shifter mechanism of claim 14 in which the openings are spaced from each other in the longitudinal direction said leaf spring member extends, one of said openings nearest said roller extending laterally of said longitudinal direction to the edge of said leaf spring member whereby the one leg nearest the roller can be inserted in a lateral direction into said one nearest opening and said leaf spring member can be tipped to provide clearance for insertion of the other leg into the other opening; and said roller support is a molded member insert molded on the other end of said leaf spring member.

16. The shifter mechanism of claim 16 in which said other leg includes an offset locking portion which engages the edge of said other opening to assist in holding the configured end of said leaf spring member on said plate.

17. The shifter mechanism of claim 16 in which said other end of said leaf spring member includes a plastic roller support for receiving the roller, the plastic acting as a low coefficient bearing permitting rotation of the roller.

18. The shifter mechanism of claim 16 in which the relationship of said configured end and opening means permits said configurated end to be inserted into said opening means when said roller is removed from engagement with said roller detent.

19. The shifter mechanism of claim 16 in which the U-shaped configurated end includes a bight portion that is depressed so as to engage that portion of said plate between said openings to stabilize said connection of said leaf spring member to said plate.

* * * * *

UNITED STATES PATENT AND TRADEMARK OFFICE
CERTIFICATE OF CORRECTION

PATENT NO. : 5,277,078
DATED : January 11, 1994
INVENTOR(S) : Charles Osborn et al.

It is certified that error appears in the above-indentified patent and that said Letters Patent is hereby corrected as shown below:

Column 7, line 18;
"less" should be --lesser--.

Column 8, line 57, claim 16;
"claim 16" should be --claim 15--.

Signed and Sealed this

Twentieth Day of September, 1994

Attest:

BRUCE LEHMAN

Attesting Officer     Commissioner of Patents and Trademarks